United States Patent [19]

Alsup et al.

[11] 4,010,360

[45] Mar. 1, 1977

[54] CARRIER-COMPATIBLE CHIRP-Z TRANSFORM DEVICE

[75] Inventors: James M. Alsup; Harper J. Whitehouse, both of San Diego, Calif.

[73] Assignee: The United States of America as represented by the Secretary of the Navy, Washington, D.C.

[22] Filed: Mar. 31, 1976

[21] Appl. No.: 672,107

[52] U.S. Cl. ................................ 235/193; 235/156

[51] Int. Cl.[2] .................... G06F 15/34; G06G 7/12

[58] Field of Search .................. 235/193, 156, 152; 324/77 B, 77 D, 77 G, 77 H; 178/DIG. 3; 333/30, 72

[56] References Cited

UNITED STATES PATENTS

| | | | |
|---|---|---|---|
| 3,925,648 | 12/1975 | Speiser et al. | 235/156 |
| 3,926,367 | 12/1975 | Bond et al. | 235/156 X |
| 3,965,343 | 6/1976 | Speiser et al. | 235/156 |
| 3,971,927 | 7/1976 | Speiser et al. | 235/156 X |

OTHER PUBLICATIONS

Alsup et al– "Real Time Discrete Fourier Transforms using Surface Acoustic Wave Devices"– IEEE International Specialist Seminar on Component Performance and System Applications of Surface Acoustic Wave Devices, Aviemore, Scotland, Sept. 1973.

*Primary Examiner*—Joseph F. Ruggiero
*Attorney, Agent, or Firm*—Richard S. Sciascia; Ervin F. Johnston; John Stan

[57] ABSTRACT

A carrier-compatible device for computing the discrete Fourier transform of an input signal, using the chirp-Z transform (CZT) algorithm, comprising means for connecting to a real and imaginary part of an input signal $g_k$. A pulse generator generates a sequence of very short pulses. A surface acoustic wave (SAW) chirp generator, whose input is connected to the output of the pulse generator, generates cosine chirp signals and sine chirp signals. Four input mixers have as their two inputs a real or imaginary part of the signal $g_k$ and a sine or cosine chirp signal from the SAW chirp generator. First and second summers have as their two inputs the outputs from two of the input mixers. A SAW chirp filter, whose two inputs are the outputs of the summers, filters out the higher components from the input signal and passes the lower components. Third and fourth summers are connected to the SAW chirp filter, whose two inputs are components from the SAW chirp filter. First and second delay lines, whose inputs are connected to the output of the sine or cosine SAW chirp generator, delay their input signals an amount of time such that their output signals are coincident in time with the output signals from the summers. Four output mixers have as their inputs the output from the first or second delay lines and the output of the third or fourth summer. Fifth and sixth summers have as their two inputs the positive or negative components from two of the four output mixers. First and second low-pass filters have as their input the output of the fifth or sixth summer, and their output comprising the real or imaginary part of a complex number $G_k$ at zero frequency.

8 Claims, 7 Drawing Figures

CHIRP-Z TRANSFORM IMPLEMENTATION OF THE DFT.

DFT VIA CZT ALGORITHM WITH PARALLEL IMPLEMENTATION OF COMPLEX ARITHMETIC.

REAL-TIME CZT PROCESSOR (2N-1 TAP FILTERS)

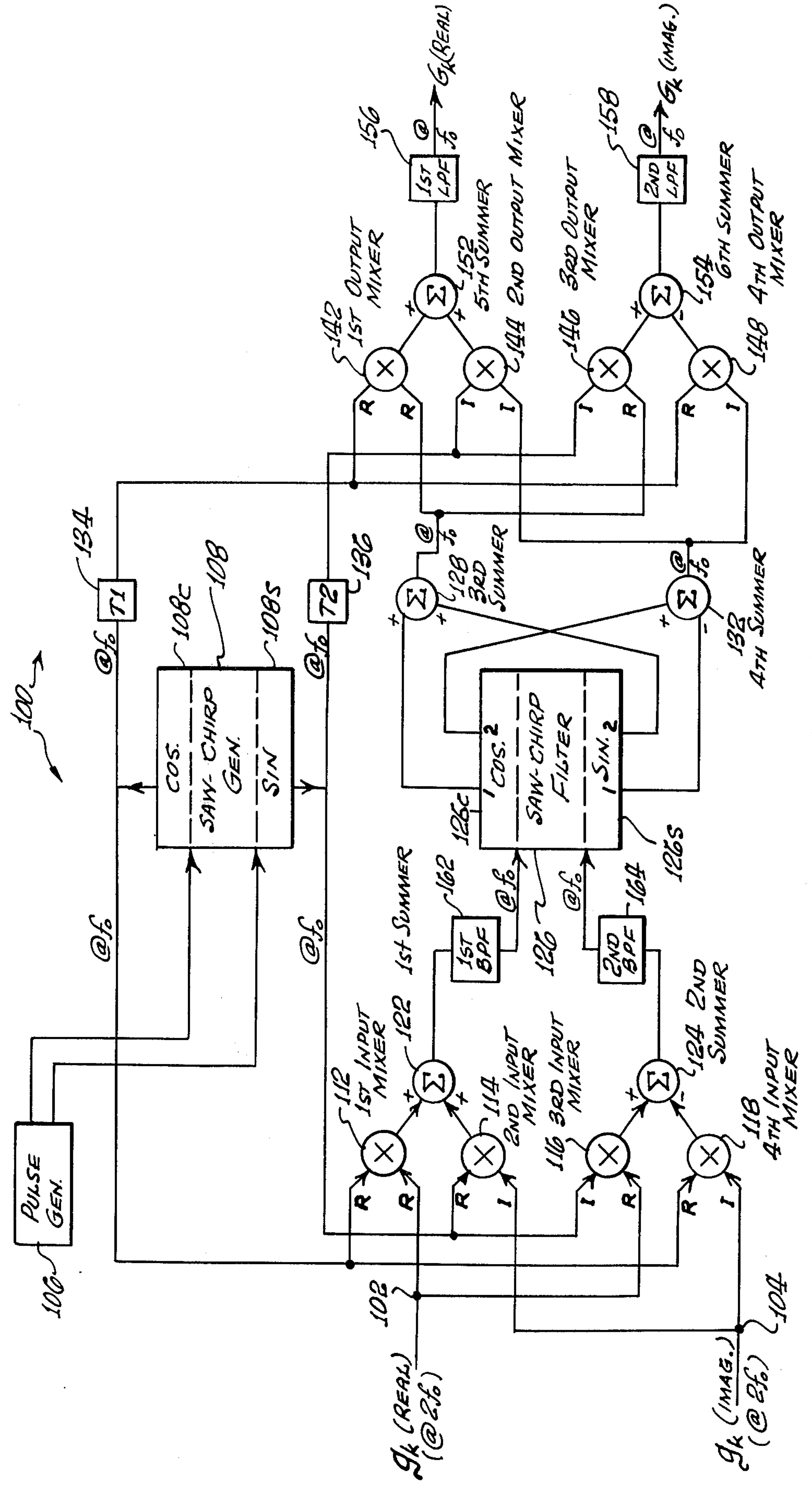
FIG. 4. CZT DEVICE, CARRIER-COMPATIBLE

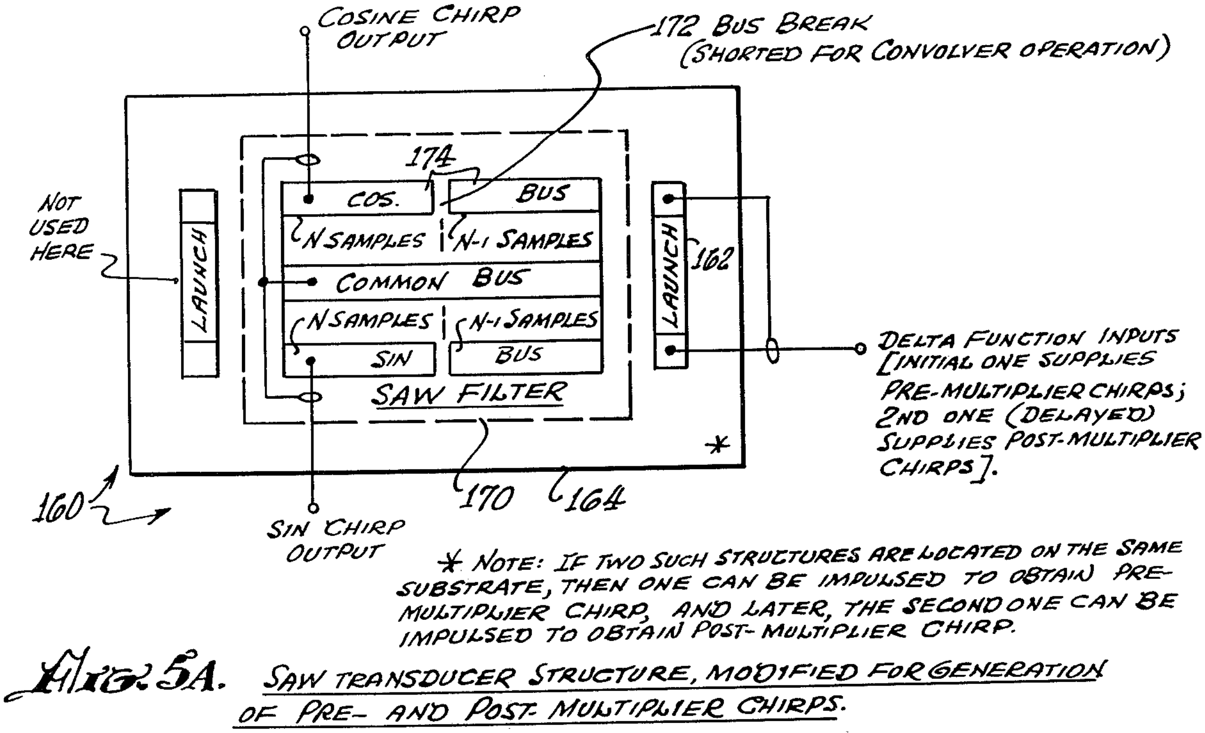

* NOTE: IF TWO SUCH STRUCTURES ARE LOCATED ON THE SAME SUBSTRATE, THEN ONE CAN BE IMPULSED TO OBTAIN PRE-MULTIPLIER CHIRP, AND LATER, THE SECOND ONE CAN BE IMPULSED TO OBTAIN POST-MULTIPLIER CHIRP.

FIG. 5A. SAW TRANSDUCER STRUCTURE, MODIFIED FOR GENERATION OF PRE- AND POST-MULTIPLIER CHIRPS.

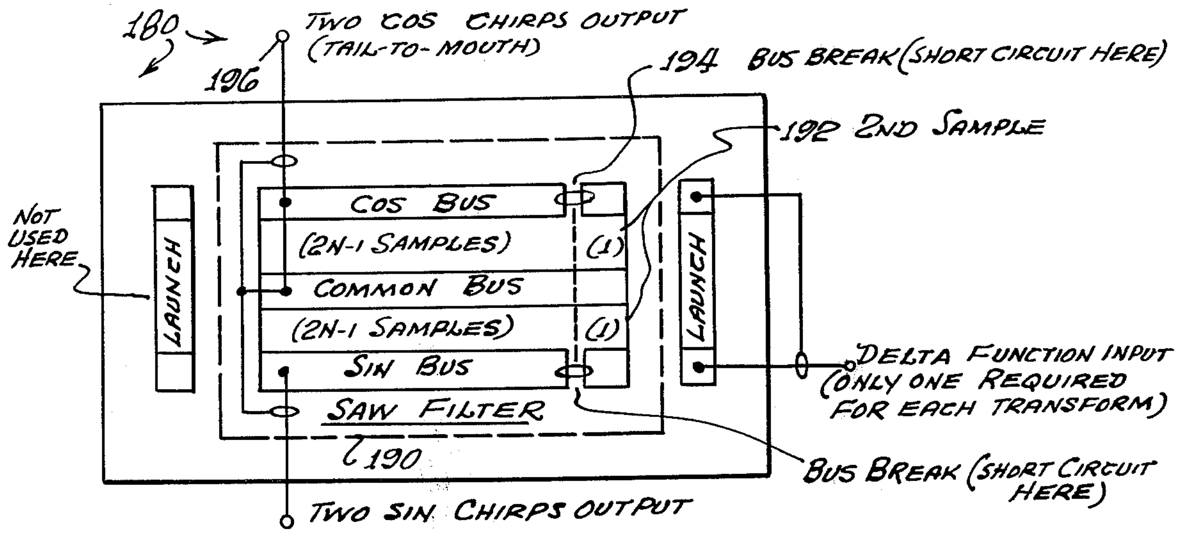

FIG. 5B. SAW TRANSDUCER STRUCTURE, MODIFIED FOR GENERATION OF PRE- AND POST-MULTIPLIER CHIRPS.

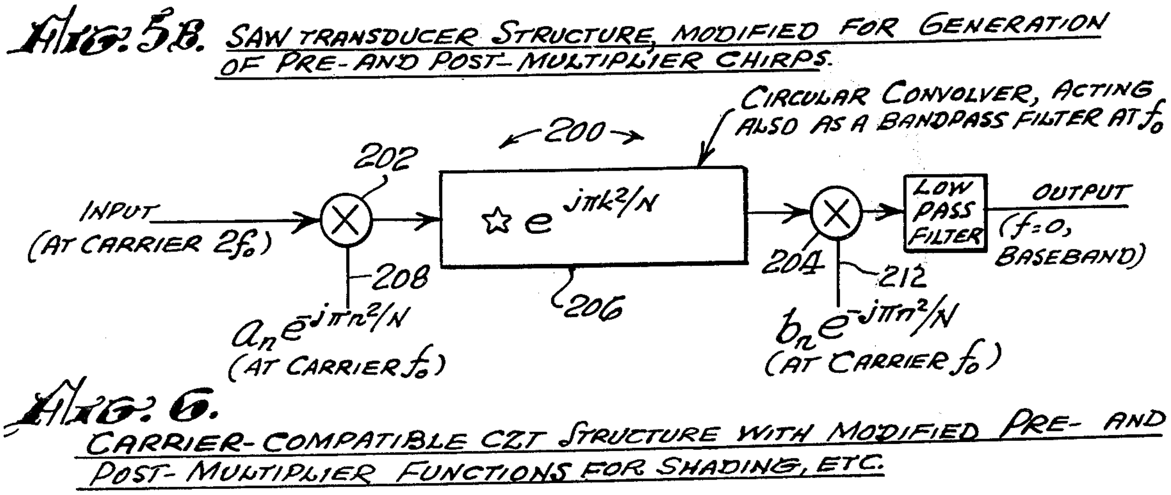

FIG. 6. CARRIER-COMPATIBLE CZT STRUCTURE WITH MODIFIED PRE- AND POST-MULTIPLIER FUNCTIONS FOR SHADING, ETC.

CARRIER-COMPATIBLE CHIRP-Z TRANSFORM DEVICE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The invention relates to a surface acoustic wave (SAW) device useful in band-limited TV systems, and suitable for carrier-compatible chirp-Z transform Fourier analysis. It includes apparatus for taking the discrete Fourier transform of a complex input signal using a SAW chirp generator, fed by a pulse generator, which generates two mutually orthogonal, sine and cosine components. Two bandpass filters are generally required, whose outputs are connected to the input of a SAW chirp filter. Two low-pass filters at the output of the device are required, one to filter the real component and the other to filter the imaginary component of the transformed complex input signal.

Prior art devices for computing the discrete Fourier transform (DFT) of an input signal using the chirp-Z transform (CZT) algorithm have relied upon a sampled format for filter, multiplier, and signal representations. They usually operated at baseband.

Such a system calculates an N-point transform via circular convolution over (2N−1) sample intervals. Thus, a pair of such systems operating "in parallel" is required to perform continuous-duty operation. Circular convolution for the CZT structure is usually accomplished in one of two ways: (a) recirculate the data back through an N-tap filter just after the Nth sample is first entered, or (b) cycle N input samples just once through a (2N−1) -tap filter whose last (N−taps are a replication of the first (N−1) taps.

SUMMARY OF THE INVENTION

This invention relates to a carrier-compatible device for computing the discrete Fourier transform of an input signal, using the chirp-Z transform (CZT) algorithm. Means are provided for connecting to a real part of an input signal $g_k$, as well as to the imaginary part of an input signal $g_k$.

A pulse generator generates a sequence of very short pulses. A surface acoustic wave (SAW) chirp generator, whose input is connected to the output of the pulse generator, generates mutually orthogonal cosine chirp signals and sine chirp signals.

A first input mixer has as its two inputs the real part of the input signal $g_k$ and a cosine chirp signal from the SAW chirp generator. A second input mixer has as its two inputs the imaginary part of the input signal $g_k$ and a sine chirp signal from the SAW chirp generator. A third input mixer has as its two inputs the real part of the input signal $g_k$ and a sine chirp signal from the SAW chirp generator. A fourth input mixer has as its two inputs the imaginary part of the input signal $g_k$ and a cosine chirp signal from the SAW chirp generator.

A first summer has as its two inputs the outputs from the first and second input mixers. A second summer has as its two inputs the output of the third and inverted output of the fourth input mixers.

A SAW chirp filter, whose two inputs are the outputs of the first and second summers, filters out the higher components from the input signal and passes the lower components, the lower frequencies having a cosine component and a sine component. This is its secondary function. Its primary function is to convolve the two input signals with its own impulse response (the cosine and sine chirp functions). The filter as diagrammed has two inputs and four outputs, each input feeding a pair of chirp filters (the cosine and sine parts).

A third summer, connected to the SAW chirp filter, has as its two inputs the +cosine No. 1 and +sine No. 2 components from the SAW chirp filter. A fourth summer, also connected to the SAW chirp filter, has as its two inputs the +cosine No. 2 component and −sine No. 1 component from the SAW chirp filter.

A first delay line, whose input is connected to the output of the cosine SAW chirp generator, delays its input signal an amount of time such that its output signal is coincident in time with the output signals from the third and fourth summers. A second delay line, whose input is connected to the output of the sine SAW chirp generator, also delays its input signal an amount of time such that its output signal is coincident in time with the output signals from the third and fourth summers. Note: These delays may also be implemented by using delayed input pulses to the cosine and sine SAW chirp generators, and then switching the generator outputs at appropriate times to either the pre- or post-multipliers.

A first output mixer has as its two inputs the output of the first delay line and the output of the third summer. A second output mixer has as its two inputs the output of the second delay line and the output of the fourth summer. A third output mixer has as its two inputs the output of the second delay line and the output of the third summer. A fourth output mixer has as its two inputs the output of the first delay line and the output of the fourth summer.

A fifth summer has as its two inputs the positive components from the first and second output mixers. A sixth summer has as its two inputs the positive output from the third output mixer and a negative output from the fourth output mixer.

A first low-pass filter has as its input the output of the fifth summer, its output comprising the real part of a complex summer $G_k$ at zero frequency and a second low-pass filter has as its input the output of the sixth summer, its output comprising the imaginary part of the complex number $G_k$ at zero frequency.

STATEMENT OF THE OBJECTS OF THE INVENTION

An object of the invention is to provide a device for computing the discrete Fourier transform (DFT) of an input signal which is carrier-compatible.

Another object of the invention is to provide a DFT device which may also be used at baseband.

Still another object of the invention is to provide a DFT device which can be operated continuously for real-time linear signal processing.

Other objects, advantages and novel features of the invention will become apparent from the following detailed description of the invention, when considered in conjunction with the accompanying drawings, wherein:

BRIEF DESCRIPTION OF THE DRAWINGS

FIG. 4 is a block diagram of the carrier-compatible CZT device of this invention.

FIG. 5, comprising FIGS. 5A and 5B, comprises a surface acoustic wave (SAW) transducer structure, modified for the generation of pre-multiplier and post-multiplier chirps.

FIG. 6 is a block diagram of a carrier-compatible CZT structure, with modified pre-multiplier and post-multiplier functions, useful for shading, etc.

DESCRIPTION OF THE PREFERRED EMBODIMENTS

Before describing the embodiments of this invention, discussion of prior art embodiments should facilitate understanding this invention.

Figure 1:
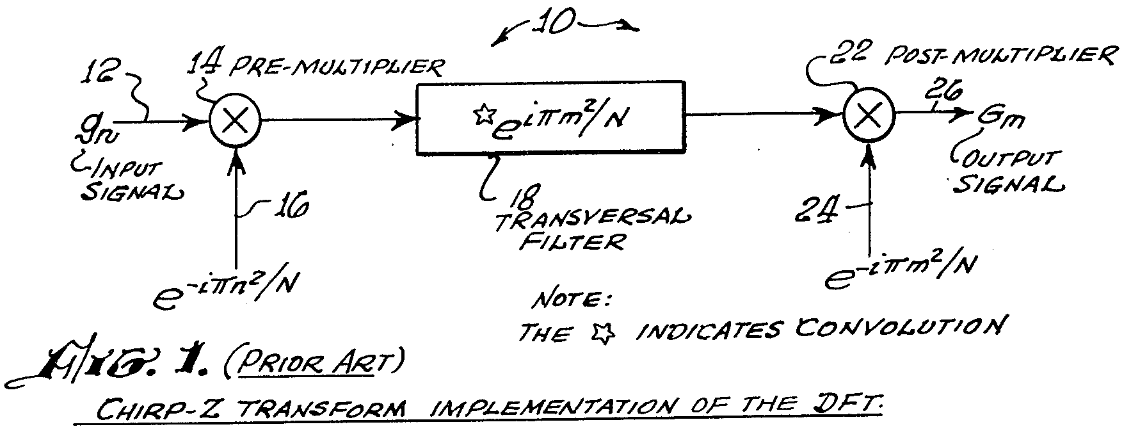
FIG. 1. (PRIOR ART)
FIG. 1 is a block diagram of a prior art chirp-Z transform implementation of the discrete Fourier transform.

Referring first to FIG. 1, this figure shows a chirp-Z transform implementation of the discrete Fourier transform (DFT). In signal processing using sampled waveforms, the finite, discrete, version of the Fourier transform is generally used.

Background information which is very useful for understanding the embodiments of this invention is found in U.S. Pat. No. 3,900,721, entitled SERIAL-ACCESS LINEAR TRANSFORM, to Speiser et al, which issued on Aug. 19, 1975. The FIG. 1 shown therein is a more generalized version of the FIG. 1 of this invention. By use of the equations shown in Column 8 of this patent, the FIG. 1 shown in the patent can be reduced to the FIG. 1 of this patent.

The patent referred to hereinabove also refers to an article entitled "High Speed Serial Access Linear Transform Implementations", described in the ARPA Quarterly Technical Report dated Mar. 1, 1973-June 1, 1973, and published by the Naval Undersea Center, San Diego, California 92132. This article, which is at a more elementary level than the patent mentioned hereinabove, provides very useful background information for understanding this invention.

In the implementation 10 shown in FIG. 1 the input signal $g_n$ comprises $g_0, g_1, g_2 \ldots, g_{N-1}$, n=0, 1, 2, . . . , N−1. A practical value of N, at the present state of the technology is any value from 8 to 10,000. However, values as low as 2 may possibly be used. The input signal $g$ is multiplied in premultiplier 14 with an input signal $e^{-i\pi\ n^2N}$ in lead 16.

The output signal from the pre-multiplier 14 enters transversal filter 18, wherein a convolution takes place, as indicated by the asterisk (*). The $e^{i\pi\ m2/N}$ term within the filter block 18 indicates the filter's impulse response. Transversal filter 18 is a complex filter, the tabs from left to right being $e^{j\pi\ 0/N}$, $e^{j\pi\ 1/N}$, $e^{j\pi\ 4/N}$, . . . The convolved signal enters post-multiplier 22, wherein it is multiplied by a signal $$e^{\frac{-i\pi m^2}{N}},$$

entering by lead 24. The output signal $G_m$ exits on lead 26.

Figure 2:
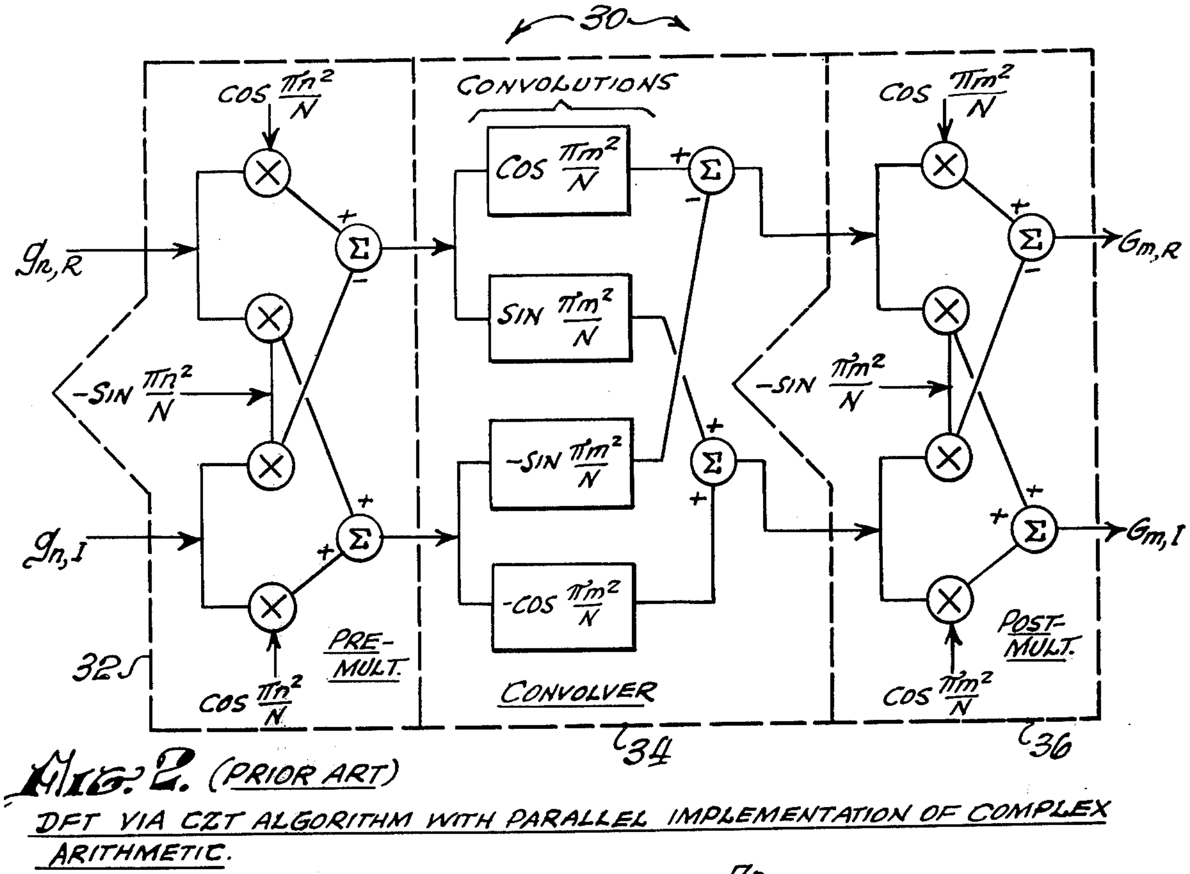
FIG. 2. (PRIOR ART)
FIG. 2 is a block diagram of a prior art specific implementation of the general implementation shown in FIG. 1 with parallel implementation of the complex arithmetic.

FIG. 2 is a prior art implementation of the generalized DFT device shown in FIG. 1. More specifically, it relates to an apparatus 30 for obtaining the discrete Fourier transform (DFT), via chirp-Z transform (CZT) algorithm, with parallel implementation of the complex arithmetic. Pre-multiplier 32, convolver 34, and post-multiplier 36 correspond to similar parts 14, 18 and 22 of FIG. 1.

Figure 3:
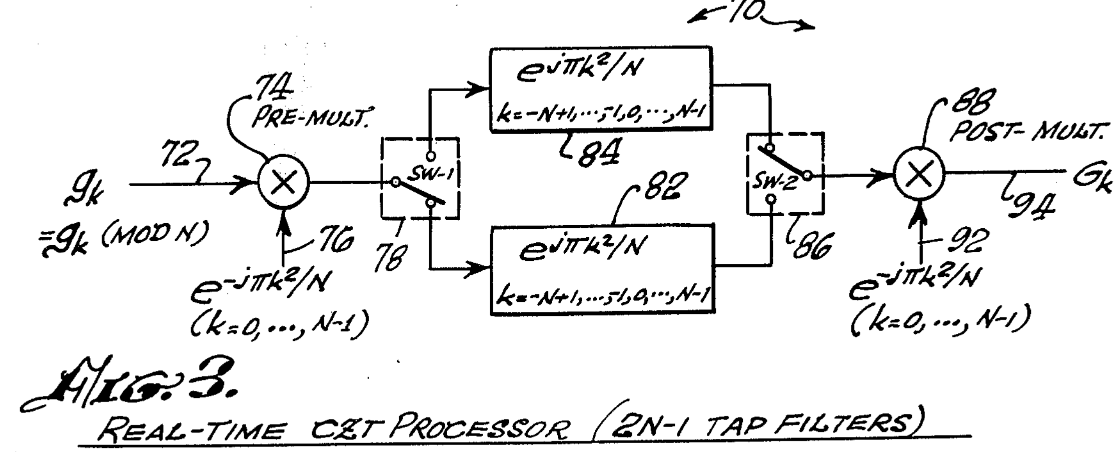
FIG. 3 is a block diagram of a real-time chirp-Z transform (CZT) processor, using two 2N−1 tap filters.

FIG. 3 shows a real-time CZT processor, using two 2N−1 filter taps. Similarly to the embodiment 10 shown in FIG. 1, the processor 70 shown in FIG. 3, pre-multiplies an input signal $g_k$, as an input on lead 72, with a signal $e^{-j\pi\ k^2N}$ on lead 76, in pre-multiplier 74, $k$=0, 1, . . . , N−1. With the switch arm of switch 78 as shown in the figure, the first N components of the signal $g_k$ would half-fill the lower transversal filter 82.

At this point, the switch arm of switch 78 would be caused to move to the upper position, and the upper transversal filter 84 would now be filled. The signal, in the meanwhile, would be traversing the other half of the taps, N taps, of lower filter 82.

At this moment in time, the switch arms of switches 78 and 86 change positions, and the pre-multiplied signal which has traversed filter 82 would now enter post-multiplier 88. After the Nth pulse has been post-multiplied, the switch arms of switches 78 and 86 would again change position, and now the pulses from the upper filter 84 would enter post-multiplier 88.

The other signal to post-multiplier 88, which would be multiplied with the aforementioned pulses from switch 86, is the signal $e^{-j\pi\ k2/N}$, $k$=0, . . . , N−1. The transformed signal $G_k$ leaves the processor on lead 94.

The first input signal to transversal filter 18 would be $g_0\, e^{-j\pi\ 0/N}$. As indicated in the figure, the filter taps of the filter of transversal filter 18 are arranged according to the complex numbers $e^{j\pi\ 0/N}$, $e^{j\pi\ 1/N}$, $e^{j\pi\ 2/N}$, . . . These are arranged in sequence from left to right. These taps of filter 18, in effect, perform a convolution in the input signal, $g_0\, e^{-i\pi\ 0/N}$, $g_1\, e^{-i\pi\ 1/N}$, $g_2 e^{-i\pi\ 4/N}$, etc., through N values.

Complex multiplication and complex convolution, which is very old in the art, is described in the ARPA article described hereinabove. Generally, to perform complex multiplication four real multipliers are required and to do complex convolution, four real convolvers are required.

If it be considered that the processor 70 is being fed by a hydrophone or by a radar antenna, or some other signal source, then this $k$ goes from zero to an indefinite number. However, the input signal $g_k$ is broken up into groups such that the groups are renumbered after every N−1 element.

Referring now to FIG. 4, therein is shown a carrier-compatible device 100 for computing the discrete Fourier transform of an input signal, using the chirp-Z transform (CZT) algorithm. Means 102 are provided for connecting to a real part of an input signal $g_k$ at a frequency of $2f_0$, as well as means 104 for connecting to the imaginary part of an input signal $g_k$ at the same frequency $2f_0$. The real part of $g_k$ is modulating a carrier at a frequency of $2f_0$, and the imaginary part of the same signal $g_k$ modulates the same carrier. The two carriers are in phase.

A pulse generator 106 generates a sequence of rectangular pulses. A surface acoustic wave (SAW) chirp generator, 108 comprising a cosine chirp generator 108C and a sine chirp generator 108C, whose input is connected to the output of the pulse generator 106, generates quadrature cosine chirp signals and sine chirp signals at a frequency of $f_0$. It's the same chirp, but they have the same relationship to each other as the sine and cosine. The property of being in quadrature means that at any instant the sine of $\theta$ squared plus the cosine of $\theta$ squared is equal to one.

The pulse response of the generator 108 is obtained. The impulse response which comes out of the pulse generator 108 is timed so that the impulses start coming out right when the $g_k$'s come into the input mixers. The $g_k$'s are segmented off to small groups of N samples each, and when the first $g_k$ comes along, a $g_0$, it is timed so that it coincides at the input port to the premultiplier at the same time that the first sample of this impulse response comes out of the SAW chirp generator 108.

A first input mixer 112 has as its two inputs the real part of the signal $g_k$ and a cosine chirp signal from the SAW chirp generator 108C. A second input mixer 114 has as its two inputs the imaginary part of the signal $g_k$ and a sine chirp signal from the SAW chirp generator 108S. A third input mixer 116 has as its two inputs the real part of the signal $g_k$ and a cosine chirp signal from the SAW chirp generator 108C. A fourth input mixer 118 has as its two inputs the imaginary part of the signal $g_k$ and a sine chirp signal from the SAW chirp generator 108S.

The chirp is essentially modulating a carrier at a frequency $f_0$, whereas the signal $g_k$ is modulating a carrier at a frequency $2f_0$. The chirp signal is being multiplied with the real part of a signal, in mixers 112, 114, 116 and 118. The chirp multiplies the signal $g_k$ but the carriers get mixed. The $g_k$ signals and the chirp signals do not get mixed, it's the carriers that get mixed. When the carriers get mixed, they give sum and difference frequencies of the carriers, so that what is obtained is the product of the chirp times the $g_k$, that is, the product of the modulating frequencies on the resulting carriers.

Referring back to FIG. 4, a first signal summer 122 has as its two inputs the outputs from the first and second input mixers, 112 and 114. A second signal summer 124 has as its two inputs the output of the third and inverted output of the fourth input mixers, 116 and 118.

A SAW chirp filter, 126 comprising a cosine SAW chirp filter 126C and a sine SAW chirp filter 126S, and whose two inputs are the outputs of the first and second summers, 122 and 124, filters out the $2f_0$ components from the input signal and passes the $f_0$ components, the $f_0$ frequencies having a cosine component and a sine component. Out of the SAW chirp filter 126 there is a carrier frequency at $f_0$ modulated by the product of two modulating signals, a chirp and a real or imaginary part of the input signal $g_k$. The chirp filter 126 is not doing any mixing, it is simply taking a signal coming in on a carrier, and filtering it by the chirp function, and it comes out on the same carrier, at the same frequency $f_0$.

At the input to the SAW chirp filter 126 there is a product of the chirp times the real and imaginary parts of $g_k$. At the output of the SAW chirp filter 126, the convolution of that input product by the impulse response of the chirp filter takes place, on the same carrier $f_0$.

A third signal summer 128, connected to the SAW sine chirp filter 126S, has as its two inputs the +cosine No. 1 and +sine No. 2 components from the SAW chirp filter. A fourth signal summer 132 connected to the SAW cosine chirp filter 126C, has as its two inputs the +cosine No. 2 component and −sine No. 1 component from the SAW chirp filter. Of course, a minus component implies the presence of a signal inverter included in the fourth summer 132.

A first delay line 134, whose input is connected to the output of the cosine SAW chirp generator 108C, delays its input signal an amount of time such that its output signal is coincident in time with the output signals from the third and fourth signal summers, 128 and 132.

A second delay line 136, whose input is connected to the output of the sine SAW chirp generator 108S, also delays its input signal an amount of time such that its output signal is coincident in time with the output signals from the third and fourth signal summers, 128 and 132.

A first output mixer 142 has as its two inputs the output of the first delay line 134 and the output of the third summer 128. A second output mixer 144 has as its two inputs the output of the second delay line 136 and the output of the fourth summer 132. A third output mixer 146 has as its two inputs the output of the second delay line 134 and the output of the third summer 128. A fourth output mixer 148 has as its two inputs the output of the first delay line 136 and the output of the fourth summer 132.

Just as the input mixers 112, 114, 116 and 118, serve the functions of premultipliers, the output mixers 142, 144, 146 and 148, serve the function of post-multipliers. They are doing the same thing as the input mixers 112–118 do, except that the chirp generator 108 has to be delayed some to allow for the intrinsic delay coming in through to the input of the output mixers. The delay will be dependent on what the intrinsic delay is coming to the output mixers, 142–148. There usually is some fixed delay, which can be determined a priori after a few devices have been manufactured.

A fifth signal summer 152 has as its two inputs the positive components from the first and second output mixers, 142 and 144. A sixth signal summer 154 has as its two inputs the positive output from the third output mixer 146 and a negative output from the fourth output mixer 148. The negative output could result from the presence of an inverter, not shown, in the sixth summer 154.

A first low-pass filter 156 has as its input the output of the first summer 152, its output comprising the real part of a complex number $G_k$ at zero frequency, or baseband. A second low-pass filter 158, whose input comprises the output of the sixth summer 154, has as its output the imaginary part of a complex number $G_k$ at zero frequency, or baseband.

The surface acoustic wave (SAW) device 100, as shown in FIG. 1, may further comprise a first band-pass filter 162, connected between the output of the first summer 122 and the input to the cosine component of the SAW chirp filter 126C. A second bandpass filter 164 is connected between the output of the second summer and the input to the sine component of the SAW chirp filter 126S.

As an output of the first or second summers, 122 and 124, there is a sum frequency of $3f_0$ and an $f_0$ as the difference frequency. The $f_0$ is desired, and so what the bandpass filters, 162 and 164, do is that they wipe out the $3f_0$ frequencies. They are bandpass filters, but in some cases, they could be lowpass. In the more general case, band-pass filters, 162 and 164, would be required. Since the device, 108 or 126, itself intrinsically acts as a bandpass filter, in some embodiments, in addition to its chirp characteristics, a separate bandpass filter, 162 or 164, may not be required.

A carrier-compatible version of the CZT device 100 is shown in FIG. 4. As a modification of the embodiment 30 shown in FIG. 2, FIG. 4 specifically calls out the desired carrier frequencies of input and resulting output signals, $g_k$ and $G_k$, and also specifically denotes the use of a SAW device 108 to generate the pre-multiplying and post-multiplying functions. If $f_1$, the input carrier frequency, is made equal to $2f_0$, where $f_0$ is the intrinsic SAW carrier frequency, then the complex product (obtained, for example, via balanced mixers) coming out of the first premultiplier section, out of summers 122 and 124, can be low-pass filtered, in first and second bandpass filters 162 and 164, so as to contain desired terms only around the carrier $f_0$, which is intrinsic to the SAW filter implementation. Postmultiplication involves the multiplication of two signals whose carriers are the same, $f_0$, so that low-pass filtering, in filters 156 and 158, results in a baseband, that is, a zero-frequency carrier transform output.

Referring now to the SAW transducer structure 160 shown in FIG. 5A, major aspect of the invention herein described is the fact that the SAW filter 170 itself can be used to generate the two N-point discrete chirp required for pre- and post-multiplication. One method, actually demonstrated, is to fabricate a break 172 (open circuit) in the bus structure 174 of the SAW filter 170 just after the Nth tap of a (2N−1)-tap filter, so that the application of an impulse to the filter's input results in outputs which are the proper N-point discrete chirp signal components, at carrier $f_0$, suitable for premultiplication. A second impulse applied to the same input transducer 162, or to an equivalent one on the same or other substrate 164, after a suitable time delay, results in the identical chirp signal components for post-multiplication. Only N of the taps are required when using it as a generator, but when using it as a filter 2N−1 taps are required. Therefore, the same piece of hardware is used, with a broken connection when needed.

Referring now to the embodiment 180 shown in FIG. 5B, a second method is to include in the original fabrication of the SAW CZT filter 190 an optionally connectable 2Nth tap 192, at 194, so that a single impulse applied to the filter input will result in the generation of two N-point discrete chirps, tail-to-mouth, at lead 196. These can be subsequently routed to pre- and post-multiplication components. In the structure 180, an input delta function need only be inserted every other period, because two periods are generated for every delta function input, when used as a chirp generator. The 2N−1 capability is required when using it as a filter.

In effect, FIGS. 5A and 5B show embodiments, 160 and 180, that use the same surface wave device, 170 or 190, as a filter, and also as the generator 108 of FIG. 4, by simply manufacturing it so that only the first N samples are utilized when using it as a generator. When a short at 172 in FIG. 5A or 194 in FIG. 5B, is used, all 2N−1 taps are used as a filter. Also, as stated in the titles of FIGS. 5A and 5B, SAW transducer structures 160 and 180 may also be used to generate pre- and post-multiplier chirps.

In another variation of the invention, assume the input carrier $f_1 = 0$, that is a baseband signal. The system should continue to perform exactly as previously specified. This also allows the output transform (at baseband) to be re-entered into the front end of the same or similar device for inverse transformation.

In another variation, assume the input carrier at $f_1 = f_a$ (an arbitrary frequency). Then a single sideband (SSB) modulator can be used to shift the carrier by the amount $f_s = f_a - 2f_0$ (or $f_s = f_a$) so as to achieve a new input frequency $f_1 = 2f_0$ (or $f_1 = 0$).

In another, third, variation, the low-pass filters 156 and 158 of FIG. 4 may be replaced by high pass filters, which produces the transform results on a carrier, $2f_0$, so that the result is suitable for entry into an original variation device for inverse transformation.

In another type of embodiment, the above variations may be utilized in combination with frequency-domain filtering or multiplication to achieve filtered or convolved signals via carrier-compatible forward/inverse transform pairs.

In yet another variation, the pre-postmultiplier SAW device 108 may be implemented at a different carrier frequency $f_0$ than was used to implement the SAW CZT filter 126, at $f_0$, with identical tap delays in the two devices. This should go hand-in-hand with the usage of $f_a = f_0' + f_0$ (or $f_a = f_0' - f_0$) for signal input carrier frequency and resulting new transform output carrier frequency $f'_0 - f_0$ (or $f'_0 + f_0$, depending on the desired variation). A particular choice with some prospects is $f'_0 = 2f_0$, $f_a = 3f_0$. This variation has the disadvantage that identical devices cannot be used for both generating and filtering operations. However, a possibly better choice is $f_0 = 0$ (as per the first variation). Then the pre- and pos-multiplier signal generators, for example, 108 of FIG. 4, are operating as base-band devices, and as such can be constructed utilizing non-SAW techniques, e.g., digital, or CCD generators.

In a sixth variation shown in CZT structure 200 in FIG. 6, the pre-post multiplier SAW (or non-SAW) device, 202 and 204, may be implemented at $f'_0 = f_0$, or at any other desired carrier frequency $f'_0 \neq f_0$ such that equivalent tap delays are equal to those intrinsic to the SAW device used to implement the CZT filter 206. The form of the pre-multiplier and/or post-multiplier functions must be changed from exp $(-j\pi n^2/N)$, and exp $(-j\pi m^2 N)$, as shown at 16 and 24 of FIG. 1, to new expressions $a_n$ exp $(-j\pi n^2/N)$ and/or $b_n \exp(-j\pi n^2/N)$, as shown at 204 and 206, in FIG. 6. By this change, complex shading functions, pre-multiplier reference functions, post-multiplier reference functions, and/or frequency domain shading functions can be incorporated into the processor 200 to achieve various modifications of linear signal processing operations such as shaded-array beamforming, matched filtering, passive ranging, etc.

In the last, seventh, variation of the post-multiplier stage may be replaced by square and sum elements, retaining the low-pass filter 156 and 158 of FIG. 4, so as to present the squared-magnitude discrete Fourier transform (DFT) as a baseband output, should no further phase information be required.

In summary, the main attributes of the invention relate to the use of surface acoustic wave (SAW) devices to perform both the convolution and pre-post-multiplier chirp generation in a carrier-compatible CZT system. Signals received on a carrier can be directly put into a CZT system via the double-balanced mixers used to achieve the pre-multiplications, while a SAW device identical to that fabricated for the chirp-filtering operation is used to supply the pre-multiplier signals which result in mixer outputs compatible with the primary SAW discrete chirp filter itself. The system is small, light-weight, low-power, and can be operated continuously for real-time linear signal processing.

Obviously, many modifications and variations of the present invention are possible in the light of the above teachings, and, it is therefore understood that within the scope of the disclosed inventive concept, the invention may be practiced otherwise than specifically described.

What is claimed is:

1. A carrier-compatible device for computing the discrete Fourier transform of a complex input signal $g_k$ having a real part and an imaginary part, using the chirp-Z transform (CZT) algorithm, comprising:

means for connecting to the real and imaginary parts of the input signal $g_k$;

a pulse generator, for generating a sequence of short rectangular pulses;

a chirp generator, whose input is connected to the output of the pulse generator, which generates cosine chirp signals and sine chirp signals;

means connected to the real and imaginary parts of the signal $g_k$ and the cosine and sine chirp signals from the chirp generator, for mixing the four combinations of two input signals at a time;

means connected to the mixing means, for summing the outputs of the mixing means;

a chirp filter, whose input is connected to the output of the summing means, which filters out the higher frequency components from its input signal and passes the lower frequency components, the lower frequencies having a real component and an imaginary component;

a second summing means whose input is connected to the output of the SAW chirp filter;

means whose input is connected to the output of the chirp generator, for delaying its input signal an amount of time such that its output signal is coincident in time with the output signals from the second summing means;

second mixing means, whose inputs comprise the output of the delaying means and the output of the second summing means;

a third summing means, whose input comprises the output from the second mixing means; and means whose input is connected to the output of the third summing means, for filtering the output of the third summing means, whose output comprises the real and imaginary parts of a complex number $G_k$ at zero frequency.

2. The carrier-compatible device according to claim 1, wherein:

the first-named mixing means comprises:

a first input mixer, whose two inputs comprise the real part of the signal $g_k$ and a cosine chirp signal from the chirp generator;

a second input mixer, whose two inputs comprise the imaginary part of the signal $g_k$ and a sine chirp signal from the chirp generator;

a third input mixer, whose two inputs comprise the real part of the signal $g_k$ and a sine chirp signal from the chirp generator; and a fourth input mixer, whose two inputs comprise the imaginary part of the signal $g_k$ and a cosine chirp signal from the chirp generator;

the first-named summing means comprises:

a first summer, whose two inputs comprise the outputs from the first and second input mixers; and a second summer, whose two inputs comprise the output of the third and the inverted output of the fourth input mixers, the inputs to the chirp filter being the outputs of the first and second summers;

the chirp filter generates +cosine No. 1 and No. 2 components and −sine No. 1 and +sine No. components;

the second summing means comprises:

a third summer connected to the SAW chirp filter, whose two inputs are the +cosine No. 1 and +sine No. 2 components from the chirp filter; and a fourth summer, connected to the SAW chirp filter, whose two inputs are the +cosine No. 2 component and −sine No. 1 component from the chirp filter;

the delaying means comprises:

a first delay line, whose input is connected to the output of the cosine chirp generator; and a second delay line, whose input is connected to the output of the sine chirp generator;

the second mixing means comprises:

a first output mixer, whose two inputs comprise the output of the first delay line and the output of the third summer;

a second output mixer whose two inputs comprise the output of the second delay line and the output of the fourth summer;

a third output mixer, whose two inputs comprise the output of the second delay line and the output of the third summer; and a fourth output mixer, whose two inputs comprise the output of the first delay line and the output of the fourth summer;

the third summing means comprises:

a fifth summer, whose two inputs comprise the positive components from the first and second output mixers; and a sixth summer, whose two inputs comprise the positive output from the third output mixer and a negative output from the fourth output mixer;

the filtering means comprises:

a first low-pass filter, whose input comprises the output of the fifth summer, and whose output comprises the real part of the complex number $G_k$; and a second low-pass filter, whose input comprises the output of the sixth summer, and whose output comprises the imaginary part of the complex number $G_k$.

3. The carrier-compatible device according to claim 2, further comprising;

a first bandpass filter connected between the output of the first summer and the input to the cosine component of the chirp filter; and a second bandpass filter, connected between the output of the second summer and the input to the sine component of the chirp filter.

4. The carrier-compatible device according to claim 3, wherein:

the chirp generator is an acoustic surfacewave (SAW) device.

5. The carrier-compatible device according to claim 4, wherein:

the chirp filter is an acoustic surfacewave (SAW) device.

6. The carrier-compatible device according to claim 4, wherein:

the chirp generator comprises 2N−1 taps, with a bus break which may be closed between the Nth and (N+1)th tap, in a manner so that: (1) with the bus open, the chirp generator serves as a chirp generator, that is, as a premultiplier and postmultiplier, but (2) with the bus shorted, the filter serves the function of a chirp filter, or convolver.

7. A real-time chirp-Z transform processor, comprising:

means for connecting to a signal $g_k$ (mod N);

a first means for connecting to a signal $e^{-j\pi k^2/N}$, $k$= 0, 1, . . . , N−1, N>2, being in the range of 8 to 10,000;

a premultiplier, whose inputs comprise the two connecting means;

a first two-polarity means, connected to the premultiplier, for connecting the output of the premultiplier alternately to one of two poles;

two transversal filters, whose inputs are connected to the poles, one filter to one pole, each transversal filter having taps configured according to the functions $e^{j\pi k^2/N}$, k=−N+1, . . . , −1, 0, 1, . . . , N−1;

a second, two-polarity, switching means, whose two poles are connected to the outputs of the two filters, one filter to one pole, for connecting the output of the switch alternatively to one of the two poles;

a second means for connecting to a signal $e^{-j\pi k^2/N}$;

a post-multiplier, whose inputs are connected to the output of the second switching means and of the second connecting means, the output comprising a chirp-Z transformed signal.

8. The processor according to claim 7 further comprising:

means for generating the signal $e^{-j\pi k^2/N}$.

* * * * *